United States Patent
Seastrom et al.

(10) Patent No.: US 9,231,903 B2
(45) Date of Patent: Jan. 5, 2016

(54) SYSTEM AND METHOD FOR RESOLVING A DNS REQUEST USING METADATA

(75) Inventors: Robert E. Seastrom, Leesburg, VA (US); Chris R. Roosenraad, Herndon, VA (US); David Trout, Aldie, VA (US); Wesley E. George, IV, Manassas, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 954 days.

(21) Appl. No.: 13/340,905

(22) Filed: Dec. 30, 2011

(65) Prior Publication Data

US 2013/0173769 A1    Jul. 4, 2013

(51) Int. Cl.
G06F 15/173    (2006.01)
H04L 29/12    (2006.01)

(52) U.S. Cl.
CPC ........ H04L 61/1511 (2013.01); H04L 61/1552 (2013.01)

(58) Field of Classification Search
CPC ... H04L 61/1511; H04L 61/35; H04L 61/103; H04L 61/1552; H04L 61/6013
USPC ...................................................... 709/223
See application file for complete search history.

(56) References Cited

U.S. PATENT DOCUMENTS

| | | | | |
|---|---|---|---|---|
| 6,304,913 B1 * | 10/2001 | Rune | ............................. | 709/241 |
| 6,785,704 B1 * | 8/2004 | McCanne | ...................... | 718/105 |
| 7,082,476 B1 * | 7/2006 | Cohen et al. | .................. | 709/246 |
| 7,086,061 B1 * | 8/2006 | Joshi et al. | .................... | 718/105 |
| 7,240,100 B1 * | 7/2007 | Wein et al. | .................... | 709/214 |
| 7,289,519 B1 * | 10/2007 | Liskov | .......................... | 370/400 |
| 7,676,576 B1 * | 3/2010 | Kommula | ...................... | 709/226 |
| 7,814,229 B1 * | 10/2010 | Cabrera et al. | ................. | 709/245 |
| 8,473,635 B1 * | 6/2013 | Lohner et al. | ................. | 709/245 |
| 8,949,850 B2 * | 2/2015 | Joshi et al. | .................... | 709/223 |
| 2004/0205162 A1 * | 10/2004 | Parikh | .......................... | 709/219 |
| 2004/0221019 A1 * | 11/2004 | Swildens et al. | .............. | 709/217 |
| 2006/0010224 A1 * | 1/2006 | Sekar et al. | ................... | 709/217 |
| 2007/0055764 A1 * | 3/2007 | Dilley et al. | ................... | 709/223 |
| 2008/0062997 A1 * | 3/2008 | Nix | ........................... | 370/395.2 |
| 2009/0259472 A1 * | 10/2009 | Schroeter | ...................... | 704/260 |
| 2011/0225263 A1 * | 9/2011 | Sureshchandra et al. | ..... | 709/217 |
| 2012/0096166 A1 * | 4/2012 | Devarapalli et al. | .......... | 709/226 |
| 2012/0185582 A1 * | 7/2012 | Graessley | ..................... | 709/224 |
| 2013/0191499 A1 * | 7/2013 | Ludin et al. | ................... | 709/217 |

OTHER PUBLICATIONS

W. Van Der Gaast, "Client subnet in DNS requests draft-vandergaast-edns-client-subnet-00," Internet Engineering Task Force (IETF), Jan. 27, 2011 (retrieved on Sep. 15, 2015 from https://web.archive.org/web/20110924054118/http://www.afasterinternet.com/ietfdraft.htm), 23 pages.

* cited by examiner

*Primary Examiner* — Richard G Keehn
(74) *Attorney, Agent, or Firm* — The Marbury Law Group, PLLC

(57) ABSTRACT

A system and method for resolving a DNS request using metadata. An intelligent name server receives a request to resolve a domain name via a network. The intelligent name server acquires at least one metadata element about the source of the request. The domain name request is transformed into a CNAME request that includes the at least one metadata element and the domain name to be resolved. The CNAME request is sent to a metadata aware DNS server for resolution. The metadata aware DNS server maps the domain name to one or more network addresses stored in a look-up table. The included metadata is used to select a "best" host address to include in a response.

22 Claims, 5 Drawing Sheets

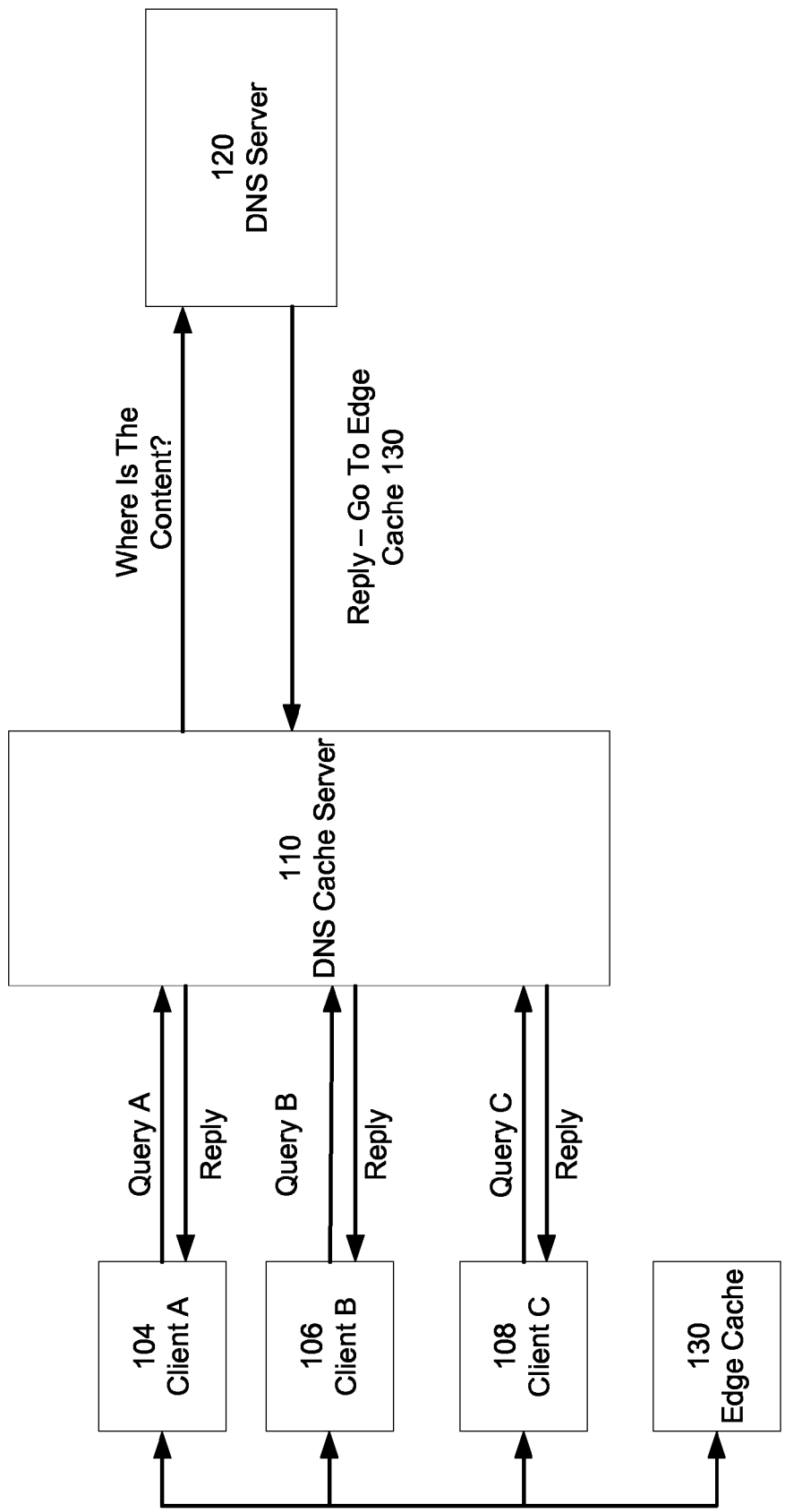

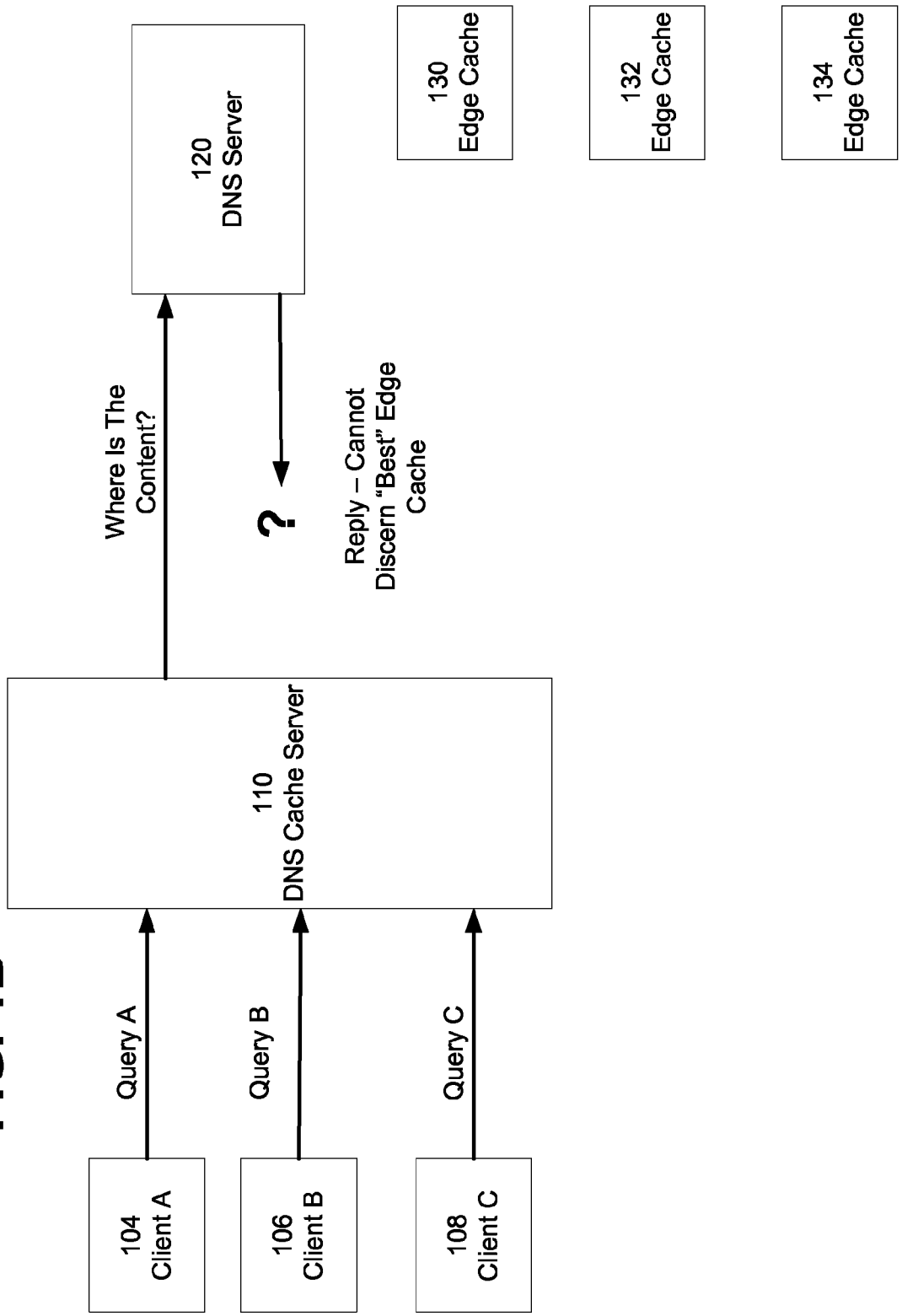

SYSTEM AND METHOD FOR RESOLVING A DNS REQUEST USING METADATA

BACKGROUND

Digital network technology has revolutionized how data and information can be accessed. Data networks interconnect host servers that provide services that range from video games and social networking sites, to email, and digital telephony. Host servers may also house data that may be useful to shoppers, to doctors, and governmental agencies.

Typically, a user will access a particular host server through a software client (for example, a browser or an email client). The user may request access by entering the Internet Protocol (IP) address of the server (for example, 68.XXX.0.1) or by entering its assigned domain name (www.patentspeak.com).

A domain name is an alphanumeric string that is associated with the IP address of a particular server and is generally easier to remember. A domain name consists of one or more parts, sometimes referred to as labels, that are conventionally concatenated, and delimited by dots, such as example.com. The right-most label conveys the top-level domain; for example, the domain name www.patentspeak.com belongs to the top-level domain com. The hierarchy of domains descends from right to left. Each label to the left specifies a subdivision, or subdomain of the domain to the right. For example, the label "patentspeak" specifies a subdomain of the com domain. WWW is a sub domain of patentspeak.com. This tree of subdivisions may have up to 127 levels.

A hostname is a domain name that is associated with at least one IP address. For example, the domain names www.patentspeak.com and patentspeak.com are also hostnames, whereas the com domain is not.

The association between a domain name and an IP address is maintained by the Domain Name System (DNS). The DNS receives a request from a user via a software client and resolves the request to return the associated IP address to the client. The client may then attempt to establish a connection between the user computer and the device associated with the returned address using the IP address provided by the DNS. In its most simple abstraction, the DNS is like a phonebook that relates names to numbers.

The DNS is a distributed system. The system may be visualized as a tree of logical and/or physical elements performing various tasks. A typical DNS may include the following elements:

Local resolver library—a library on a user computing device that implements programmatic interfaces such as gethostbyname( ) and getaddrinfo( ) and generates a query that is sent over the network to a caching DNS server.

Caching (recursive) DNS server—a server that attempts to resolve a query. The caching DNS server will first attempt to find the requested IP address in its cache. If the address is not found, the caching DNS will generate its own query that is sent to other DNS name servers. The caching DNS server may reside on the same computing device as the local resolver library. In the retail environment, the caching DNS server is provided by an Internet service provider (ISP) as part of a customer's Internet service.

Authoritative DNS server—a server that provides answers to queries. The authoritative DNS server operates as the database back end that houses the association of a host name to one or more IP addresses.

When an application makes a request that requires a domain name lookup, the application will send a resolution request to the DNS resolver. The DNS resolver will typically have a cache containing recent lookups. If the cache contains the answer to the request, the resolver will return the value in the cache to the application that made the request.

If the cache does not contain the answer, the resolver will send the request to one or more designated caching DNS servers. The caching DNS server thus queried will search its cache and, if the answer is not cached, will search the DNS for a name server that can resolve the request. The answer, if found, is returned to the DNS resolver, cached for future use and provided to the application that initiated the request.

The distributed architecture of the DNS allows for efficient use of name servers thereby reducing the burden on authoritative DNS servers.

A content distribution network (CDN) is an architecture that is also intended to improve network efficiency and reduce infrastructure costs. A CDN achieves its efficiency by directing clients on a regional, continental, or global scale to download content from a server that is topologically closest to them, possibly with an overlay of geopolitical considerations. Mappings in a CDN are typically managed via DNS.

In a CDN, a single hostname may map to multiple IP addresses. In the case of a CDN, an intelligent authoritative name server responds to queries differently depending on what recursive name server responds to a particular query from a client. The presumption is that the responsible recursive DNS server is in close proximity (geographically and topologically) to the querying client. The intelligent authoritative name server uses information it receives from the caching DNS server to determine which response to return to the caching DNS server.

However, it is often the case that the caching DNS server is not, in fact, located near the requesting computing device. Further, the granularity of the response from the intelligent authoritative name server is limited to the proximity information provided by the caching DNS server making the request. That is, the intelligent authoritative name server does not receive proximity information about the computing device that originated the request. Additionally, the current architecture of CDNs does not contemplate obtaining information from a computing device that may be used for other network management functions.

SUMMARY

Embodiments herein are directed to providing information about the initial source of a domain name query from an "intelligent" caching name server where that information is obvious (it is the source address of the DNS query packet) to the authoritative name server where the mapping decision is made. In an embodiment, the intelligent name server responds to a query by returning a CNAME record with metadata that may be discerned directly or indirectly by examination of the original DNS query. The information about the source may include geographic location information, client capability information, source IP address, source subnet, IP version, operating system information and network location information.

DESCRIPTION OF THE DRAWINGS

FIG. 1A is a block diagram illustrating a network having a single edge cache server.

FIG. 1B is a block diagram illustrating a network having multiple edge cache servers.

DETAILED DESCRIPTION

Figure 1C:
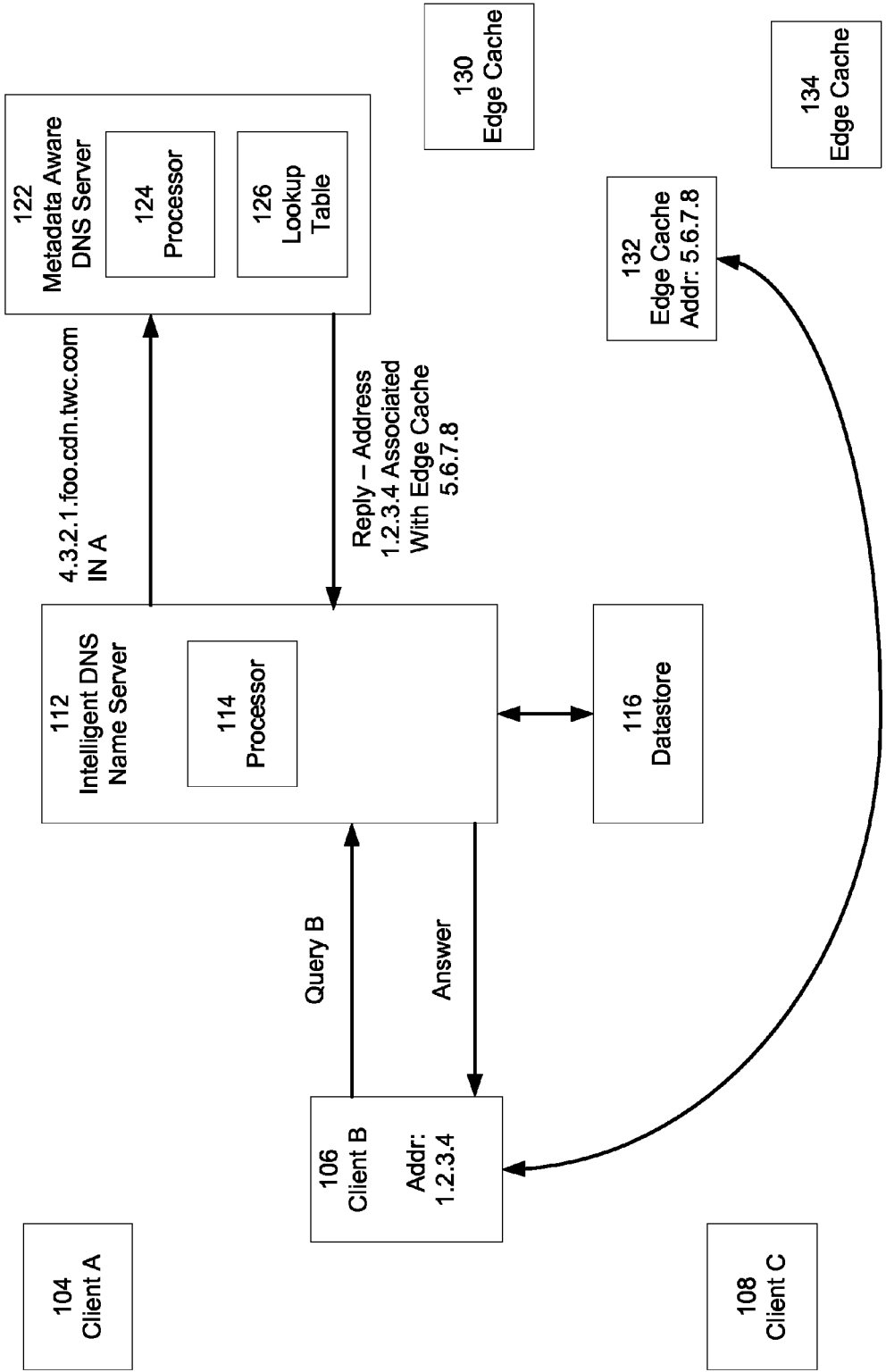
FIG. 1C is a block diagram illustrating a network having an intelligent name server and multiple edge cache servers according to an embodiment.

Embodiments herein are directed to providing information about the initial source of a domain name query from an "intelligent" caching name server where that information is obvious (it is the source address of the DNS query packet) to the authoritative name server where the mapping decision is made. In an embodiment, the intelligent name server responds to a query by returning a CNAME record with metadata that may be discerned directly or indirectly by examination of the original DNS query. The information about the source may include location information, capability information, IP address, subnet, IP address version, subscriber information, operating system information and network topographical information.

FIG. 1A is a block diagram illustrating a network having a DNS cache server 110 and a single edge cache server 130. Computing devices A, B and C (blocks 104, 106 and 108 respectively) may have unique attributes that are defined by metadata. For example, computing devices A, B and C may be geospatially separated within the network topology, may use different operating systems, and/or may be entitled to different levels of service.

In an embodiment, the edge cache server 130 stores content of interest to the computing devices A, B and C. By way of example and not by way of limitation, the computing devices A, B and C may be operated by subscribers of a content distribution network (not illustrated) such as a media network and the edge cache server 130 may store content accessible to computing devices A, B and C. In an embodiment, the content stored in edge cache server 130 may be a text file, an audio file, a video file, a game file, and an image file that may be delivered to subscribers of the content distribution network, such as subscribers that operate computing devices A, B and C. By way of illustration and not by way of limitation, the content distribution network may be a media network that is operated for subscribers that pay a service fee, a private network, an enterprise network, a government network or a university network.

The DNS cache server 110 communicates with a DNS server 120 to resolve a DNS request made by computing devices A, B and C. Because the network has only a single edge cache server 130, in this example the geospatial differences between the computing devices A, B and C do not influence the response of the DNS server 120. That is, all DNS queries from computing devices A, B and C are directed to edge cache 130.

FIG. 1B is a block diagram illustrating a network having a DNS cache server 110 and multiple edge cache servers (blocks 130, 132 and 134). Computing devices A, B and C (blocks 104, 106 and 108 respectively) may have unique attributes that are defined by metadata. For example, computing devices A, B and C may be geospatially separated within the network topology, may use different operating systems, and/or may be entitled to different levels of service.

In an embodiment, the content stored in edge cache servers 130, 132 and 134 may be a text file, an audio file, a video file, a game file, and an image file that may be delivered to subscribers of the content distribution network, such as subscribers that operate computing devices A, B and C. By way of illustration and not by way of limitation, the content distribution network may be a media network that is operated for subscribers that pay a service fee, a private network, an enterprise network, a government network or a university network.

The DNS cache server 110 communicates with a DNS server 120 to resolve a DNS request made by computing device B 106. In an embodiment, one of the multiple edge cache servers 130, 132 and 134 may be a "best" choice for queries from computing device A while a different edge cache server may be "best" choice for computing devices B and C. In this configuration, the DNS server 120 may be "aware" of the DNS cache server 110. This awareness may include information regarding the location of the DNS cache server 110. However, the DNS server 120 has no information regarding the geospatial differences between the computing devices A, B and C and the proximity of each computing device to edge cache servers 130, 132 and 134. Thus, the DNS server 120 does not have enough information to choose among edge cache servers 130, 132 and 134.

FIG. 1C is a block diagram illustrating a network having an intelligent DNS name server 112 and multiple edge cache servers (blocks 130, 132 and 134). The intelligent DNS name server 112 includes a processor 114 and a link to a datastore 116. Computing devices A, B and C (blocks 104, 106 and 108 respectively) may have unique attributes that are defined by metadata. For example, computing devices A, B and C may be geospatially separated within the network topology, may use different operating systems, and/or may be entitled to different levels of service.

In an embodiment, the edge cache servers 130, 132 and 134 store content of interest to the computing devices A, B and C. By way of illustration and not by way of limitation, the computing devices A, B and C may be operated by subscribers of a content distribution network (not illustrated) and the edge cache servers 130, 132 and 134 may store content accessible to computing devices A, B and C. In an embodiment, the content stored in edge cache servers 130, 132 and 134 may be a text file, an audio file, a video file, a game file, and an image file that may be delivered to subscribers of the content distribution network, such as subscribers that operate computing devices A, B and C. By way of illustration and not by way of limitation, the content distribution network may be a media network that is operated for subscribers that pay a service fee, a private network, an enterprise network, a government network or a university network.

The intelligent name server 112 communicates with a metadata aware DNS server 122 to resolve a DNS request made by computing device B 106. In an embodiment, upon receipt of the query from computing device B 106, the processor 114 of intelligent name server 112 dynamically generates a CNAME response that includes the metadata relating to computing device B 106. The semantics of a CNAME record are "start the query over again using *this name* instead and return both the CNAME redirection and the ultimate data object in the ANSWER section." Thus, by dynamically creating a CNAME redirection, metadata can be embedded which will subsequently be visible by the authoritative DNS server.

The metadata associated with computing device B 106 may be obtained directly by the intelligent name server 112 from the query, such as the IP address of computing device B 106, or indirectly using the IP address of computing device B 106 as a pointer to other information located in datastore 116. By way of illustration and not by way of limitation, the IP address of computing device B 106 may be associated with a regional data center identifier, a headend identifier, a network node identifier, a network location identifier, a physical address identifier, a cable modem termination system identifier, device capability information, and subscriber account information, among others. Metadata may also include subnet or other incomplete representation of the IP address, the IP version (v4 or v6) over which the query was delivered, a common language location identifier (CLLI) code, a head end identifier, or other table-derived data relating to the geographical or topological source of the query. Metadata may also include the operating system (OS) type making the query derived by heuristic inspection of the query packet to identify traits that are idiosyncratic to a particular implementation. The foregoing examples are illustrative and not meant to be limiting. The metadata may include any information that may be derived by the intelligent DNS name server 112 via queries that it receives, is of interest to the operator of a CDN or intelligent DNS server 112 in making policy decisions, and can be coded into the look-up table 126 of the metadata aware DNS server 122 to direct an action.

In an embodiment, a processor 124 of the metadata aware DNS server 122 maps the query to a network address stored in a look-up table 126 using the included metadata to select a "best" host address to include in a response. By way of illustration and not by way of limitation, the intelligent name server 112 may receive the query "foo.cdn.twc.com" from computing device B 106. In response, the processor 114 generates a CNAME response that includes the IP address of computing device B 106 in the form: foo.cdn.twc.com IN CNAME 4.3.2.1.foo.cdn.twc.com. The CNAME response is then forwarded to the metadata aware DNS server 122. In this illustration, the processor 124 of the metadata aware DNS server 122 parses the CNAME response to obtain the IP address of the computing device B 106. The processor 124 uses the IP address of the computing device to select from the look-up table 126 an IP address of a "best" edge cache from edge caches 130, 132, and 134 to answer the query. As illustrated in FIG. 1C, based on the IP address of computing device B 106, the metadata aware DNS server 122 resolves the query by selecting edge cache server 132 (IP address 5.6.7.8). This address is returned to the intelligent name server 112, which then forwards a response to computing device B 106. Computing device B then accesses the edge cache server 132.

As described above, the CNAME response includes metadata associated with the computing device that initiates the query. In the example given above, the CNAME response was structured with the metadata presented from right to left. In an alternative embodiment, the metadata is presented in left to right format. Thus, the CNAME response in this alternative embodiment would be presented in the form: foo.cdn.twc.com IN CNAME 1.2.3.4.foo.cdn.twc.com.

An advantage of the right to left form is that it facilitates wildcarding by distributing the semantics of the metadata hierarchically with DNS zone cuts. Wildcarding permits the metadata aware DNS server 122 to select a network address for a query that matches certain (but not all) metadata elements. DNS queries are evaluated right to left, and wildcards are only permissible for "everything to the left of here." That is to say, *.FOO.BAR.CDN.TWC.COM is a valid representation while FOO.*.BAR.CDN.TWC.COM is not permitted.

In an embodiment, a response to a query is encoded in an "in-addr format" so as to result in query/result pairs. For example, a query from 192.0.2.30 for FOO.CDN.TWC.COM will result in the reply: FOO.CDN.TWC.COM IN CNAME 30.2.0.192.FOO.CDN.TWC.COM.

In another embodiment, a query heard over IPv6, may be encoded using the address in ip6.arpa format. For example, a query from 2610:178:1:1::b for FOO.CDN.TWC.COM would result in the reply:
FOO.CDN.TWC.COM IN CNAME b.0.0.0.0.0.0.0.0.0.0.0.0.0.0.0.1.0.0.0.1.0.0.0.8.7.1.0.0.1.6.2.FOO.CDN.TWC.COM.

In an embodiment, metadata relating to a location of a computing device may be encoded using a common language location identifier (CLLI) code. A CLLI code is a Telcordia standard for identifying physical locations in a telephone network. It consists of a string of eleven characters. Four characters are assigned to identify a city, followed by two characters that are assigned to identify a state, followed by two characters that are assigned to identify a canonical site name, and three characters that are assigned to identify a switching entity identifier (which identifies a particular switching entity at that site). For example, MCLNVALVDS0 and LSBGVALBDS0 are CLLI codes for switches in the Lewinsville central office in McLean, Va. and the Leesburg central office in Leesburg, Va. respectively. In an embodiment, a CLLI code format is rearranged such that it is in a least-significant-to-most-significant order, based on likely wildcarding patterns. For example, the CLLI codes presented above would be reordered to read, "ds0.lv.mcln.va" and "ds0.lb.lsbg.va." These reordered codes may be embedded in DNS queries as follows: Query from an address which is in McLean, Va. results in the CNAME response: FOO.CDN.TWC.COM IN CNAME DS0.LV.MCLN.VA.FOO.CDN.TWC.COM.

Levels of specificity may be omitted on the client side or wildcarded on the server side. For example, the following CNAME responses are possible:
Query from 192.0.2.30 for FOO.CDN.TWC.COM will result in the reply:
FOO.CDN.TWC.COM IN CNAME 0.192.FOO.CDN.TWC.COM.
Query from an address which is in McLean, Va. results in the reply:
FOO.CDN.TWC.COM IN CNAME LV.MCLN.VA.FOO.CDN.TWC.COM.
In embodiments in which wildcarding is not used, the following CNAME responses are possible:
Query from 192.0.2.30 for FOO.CDN.TWC.COM will result in the reply:
FOO.CDN.TWC.COM IN CNAME 192.0.2.30.FOO.CDN.TWC.COM.
Query from an address which is in McLean, Va. results in the reply:
FOO.CDN.TWC.COM IN CNAME MCLNVALVDS0.FOO.CDN.TWC.COM.
In all of the examples set forth above, the encoded metadata facilitates returning different records based on proximity of edge servers to the source of the initial query.

Metadata may also be used for other purposes. For example, the IPv4 vs. IPv6 distinction is useful for determining capabilities of a computing device. Some resolver libraries will preferentially send a query over IPv6 if it is available. If a query is heard by the intelligent name server 112 over IPv6, then the computing device from which the query originates has IPv6 available and operating. While this capability information is useful to determine the type of record ultimately returned (i.e., A vs. AAAA for v4 or v6 respectively), the information may also be useful for statistical analysis of IPv6 uptake. Other metadata may also be used for network management purposes.

In an embodiment, the intelligent name server 112 distinguishes queries that originate from a Microsoft DNS library from those that originate from a Unix libresolv.so. In networks in which the operating system under which the computing device operates is a significant factor in selecting a host address in response to a query, the operating system metadata may be inserted in a "most significant, least wildcardable" position. For example, a query from 192.0.2.30 for FOO.CDN.TWC.COM will result in the reply:
FOO.CDN.TWC.COM IN CNAME 30.2.0.192.UNIX.FOO.CDN.TWC.COM.

Alternatively, if the operating system metadata is not a significant factor in the selection of the host address (for example, in cases where it is collected for informational or statistical purposes), the operating system metadata may be inserted in a "least significant, most wildcardable" position. For example, a query from 192.0.2.30 for FOO.CDN.TWC.COM will result in the reply: FOO.CDN.TWC.COM IN CNAME UNIX.30.2.0.192.FOO.CDN.TWC.COM.

Figure 2:
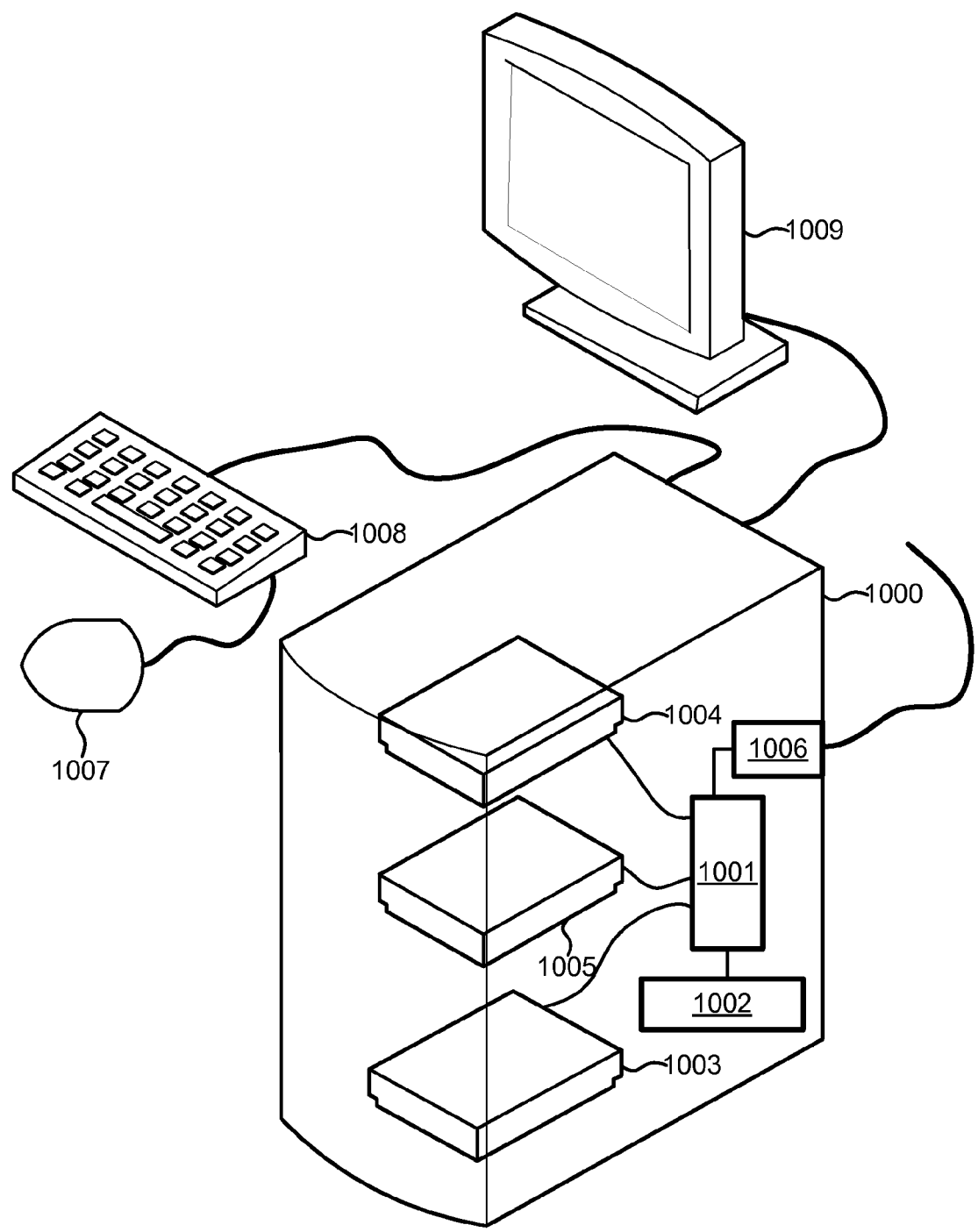
FIG. 2 is a block diagram of a computing device.
Figure 3:
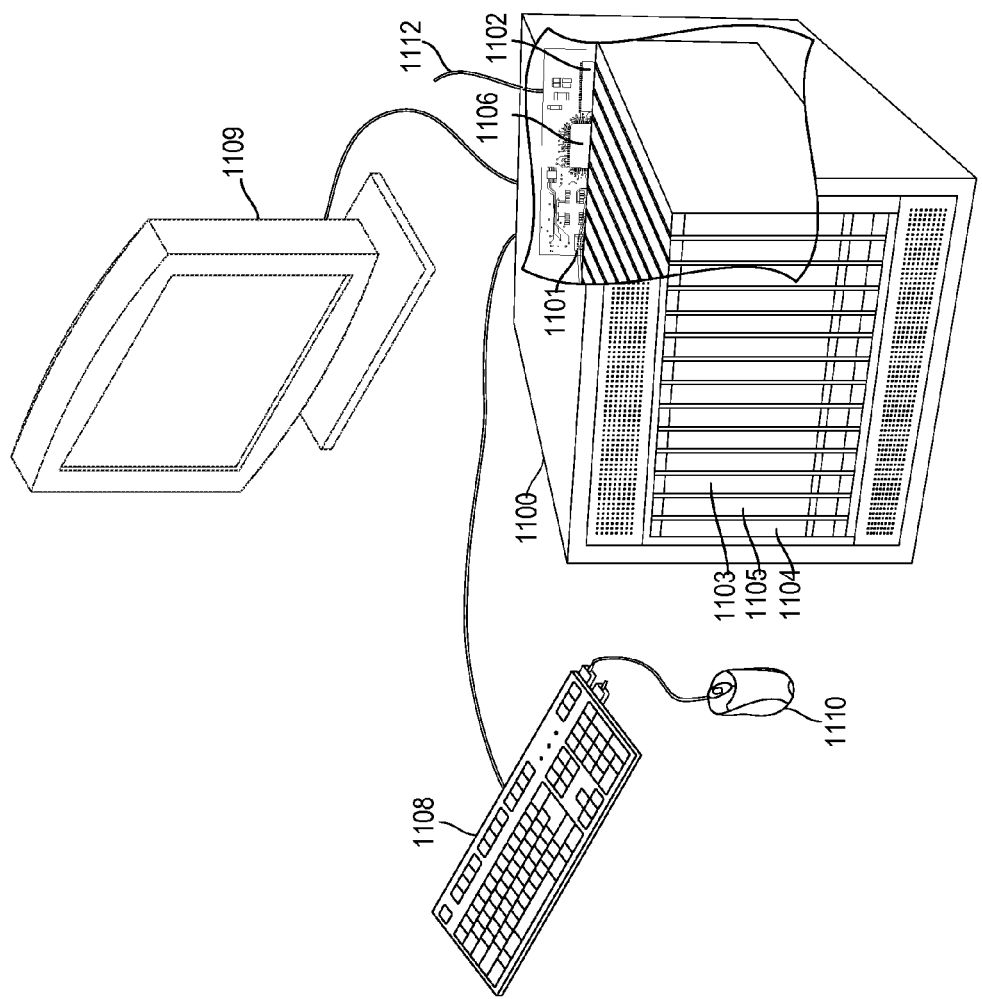
FIG. 3 is a block diagram of a server device.

A number of the embodiments described above may also be implemented with any of a variety of computing devices, such as the computing device 1000 illustrated in FIG. 2 and the server device illustrated in FIG. 3.

FIG. 2 is a block diagram of a computing device suitable for use with any of the embodiments Such a computing device 1000 typically includes a processor 1001 coupled to volatile memory 1002 and a large capacity nonvolatile memory, such as a disk drive 1003. Typically, software applications may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or FireWire® connector sockets. In a notebook configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of computing device 1000 may be implemented as a desktop computer, a laptop computer, a mini-computer, or a personal data assistant.

Various embodiments may also be implemented on any of a variety of commercially available server devices, such as the server 1100 illustrated in FIG. 3. By way of illustration and not by way of limitation, DNS servers 110, 112 and 122 may be implemented on a server, including, by way of example, server 1100. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Server 1100 may also include operator interfaces, such as a keyboard 1108, pointer device (e.g., a computer mouse 1110), and a display 1109.

The processors 1001 and 1101 may be any programmable microprocessor, microcomputer or multiple processor chip or chips that can be configured by software instructions (applications) to perform a variety of functions, including the functions of the various embodiments described above.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media include both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for resolving a domain name system request comprising:
    receiving, at an intelligent name server, a domain name request to resolve a domain name via a network, wherein the intelligent name server comprises a first processor;
    acquiring, by the first processor, at least one metadata element from the domain name request about a source of the domain name request;
    transforming, by the first processor, the domain name request into a CNAME request, wherein the CNAME request comprises the at least one metadata element and the domain name, the at least one metadata element enabling a metadata aware DNS server to resolve the domain name into one of a plurality of host IP addresses that correspond to the domain name, wherein the at least one metadata element comprises information indicative of a network location of the source; and
    sending, by the first processor, the CNAME request to the metadata aware DNS server for resolution of the domain name.

2. The method of claim 1, wherein the information indicative of the network location of the source is selected from the group consisting of a regional data center identifier, a headend identifier, a network node identifier, a network location identifier, a physical address identifier, and a cable modem termination system identifier.

3. The method of claim 1, wherein, acquiring by the first processor, the at least one metadata element from the domain name request about the source of the domain name request comprises:
    acquiring, by the first processor, an IP address of the source of the domain name request; and
    acquiring, by the first processor, the at least one metadata element about the source of the domain name request using the IP address.

4. The method of claim 3, wherein acquiring, by the first processor, the at least one metadata element from the domain name request about the source of the domain name request using the IP address comprises:
    accessing, by the first processor, a datastore, wherein the datastore comprises a record associating the IP address of the source of the domain name request with at least one additional metadata element selected from the group consisting of a regional data center identifier, a headend identifier, a network node identifier, a network location identifier, a physical address identifier, a cable modem termination system identifier, device capability information, and subscriber account information; and
    selecting, by the first processor, one or more additional metadata elements from the datastore.

5. The method of claim 1 further comprising:
    receiving, by the metadata aware DNS server, the CNAME request, wherein the metadata aware DNS server comprises a second processor and a look-up table comprising entries associating the domain name with the plurality of host IP addresses and one or more metadata elements;
    comparing, by the second processor, the domain name in the CNAME request to the IP address entries in the look-up table to obtain the plurality of host IP addresses associated with the domain name;
    comparing, by the second processor, the at least one metadata element in the CNAME request to the one or more metadata elements in the look-up table to select a host IP address from the plurality of host IP addresses associated with the domain name; and
    returning, by the second processor, a selected host IP address to the intelligent name server.

6. The method of claim 5, wherein the selected host IP address is assigned to a host device that is most proximate to the network location of the source of the domain name request.

7. The method of claim 6, wherein the network is a content distribution network and wherein the host device stores content.

8. The method of claim 7, wherein the content is selected from the group consisting of a text file, an audio file, a video file, a game file, and an image file.

9. The method of claim 5, wherein the at least one metadata element is represented as an alpha-numeric string that is ordered to provide increasingly significant values from a right most position of the string to a left most position of the string and wherein comparing, by the second processor, the at least one metadata element in the CNAME request to the one or more metadata elements in the look-up table to select the host IP address from the plurality of host IP addresses associated with the domain name comprises:
    reading, by the second processor, the ordered alpha-numeric string from right to left; and comparing, by the second processor, the at least one metadata element in the CNAME request to the one or more metadata elements in the look-up table to select the host IP address from the plurality of host IP addresses associated with the domain name.

10. The method of claim 9, wherein the value of right most position of the ordered string is a wildcard symbol.

11. The method of claim 1, wherein the at least one metadata element further comprises at least one of device capability information and subscriber account information.

12. A system for resolving a domain name system request comprising:
an intelligent name server connected to a network, comprising a first processor configured with software executable instructions to cause the intelligent name server to perform operations comprising:
receiving a domain name request to resolve a domain name via the network;
acquiring at least one metadata element from the domain name request about a source of the domain name request;
transforming the domain name request into a CNAME request, wherein the CNAME request comprises the at least one metadata element and the domain name, the at least one metadata element enabling a metadata aware DNS server to resolve the domain name into one of a plurality of host IP addresses that correspond to the domain name, wherein the at least one metadata element comprises information indicative of a network location of the source; and
sending the CNAME request to the metadata aware DNS server for resolution of the domain name.

13. The system of claim 12, wherein the information indicative of the network location of the source is selected from the group consisting of a regional data center identifier, a headend identifier, a network node identifier, a network location identifier, a physical address identifier, and a cable modem termination system identifier.

14. The system of claim 12, wherein acquiring the at least one metadata element from the request comprises:
acquiring an IP address of the source of the domain name request; and
acquiring the at least one metadata element about the source of the domain name request using the IP address.

15. The system of claim 14, wherein acquiring the at least one metadata element from the domain name request about the source of the domain name request using the IP address comprises:
accessing a datastore, wherein the datastore comprises a record associating the IP address of the source of the domain name request with at least one additional metadata element selected from the group consisting of a regional data center identifier, a headend identifier, a network node identifier, a network location identifier, a physical address identifier, a cable modem termination system identifier, device capability information, and subscriber account information; and
selecting one or more additional metadata elements from the datastore.

16. The system of claim 12, further comprising a metadata aware DNS server, wherein the metadata aware DNS server comprises a look-up table comprising entries associating the domain name with the plurality of host IP addresses and one or more metadata elements and a second processor, and wherein the second processor is configured with software executable instructions to cause the metadata aware DNS server to perform operations comprising:
receiving the CNAME request;
comparing the domain name in the CNAME request to the IP address entries in the look-up table to obtain the plurality of host IP addresses associated with the domain name;
comparing the at least one metadata element in the CNAME request to the one or more metadata elements in the look-up table to select a host IP address from the plurality of host IP addresses associated with the domain name; and
returning by the second processor the selected host IP address to the intelligent name server.

17. The system of claim 16, wherein the selected host IP address is assigned to a host device that is most proximate to the network location of the source of the domain name request.

18. The system of claim 17, wherein the network is a content distribution network and wherein the host device stores content.

19. The system of claim 18, wherein the content is selected from the group consisting of a text file, an audio file, a video file, a game file, and an image file.

20. The system of claim 16, wherein the at least one metadata element is represented as an alpha-numeric string that is ordered to provide increasingly significant values from a right most position of the string to a left most position of the string and wherein the instruction for comparing the at least one metadata element in the CNAME request to the one or more metadata elements in the look-up table to select the host IP address from the plurality of host IP addresses associated with the domain name comprises instructions for:
reading the ordered alpha-numeric string from right to left; and
comparing the at least one metadata element in the CNAME request to the one or more metadata elements in the look-up table to select the host IP address from the plurality of host IP addresses associated with the domain name.

21. The system of claim 20, wherein the value of the right most position of the ordered string is a wildcard symbol.

22. The system of claim 12, wherein the at least one metadata element further comprises at least one of device capability information and subscriber account information.

* * * * *